Patented Apr. 29, 1941

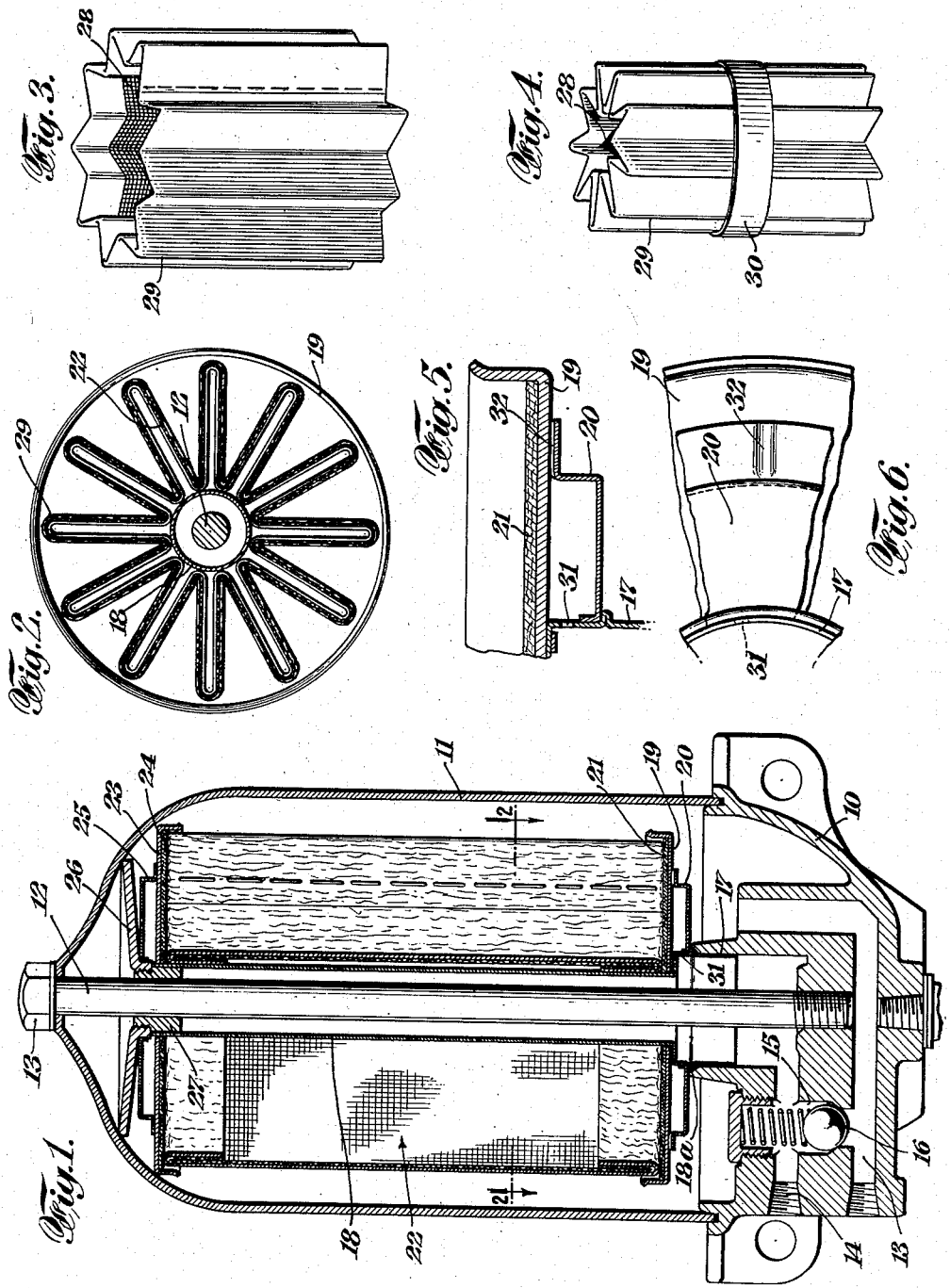

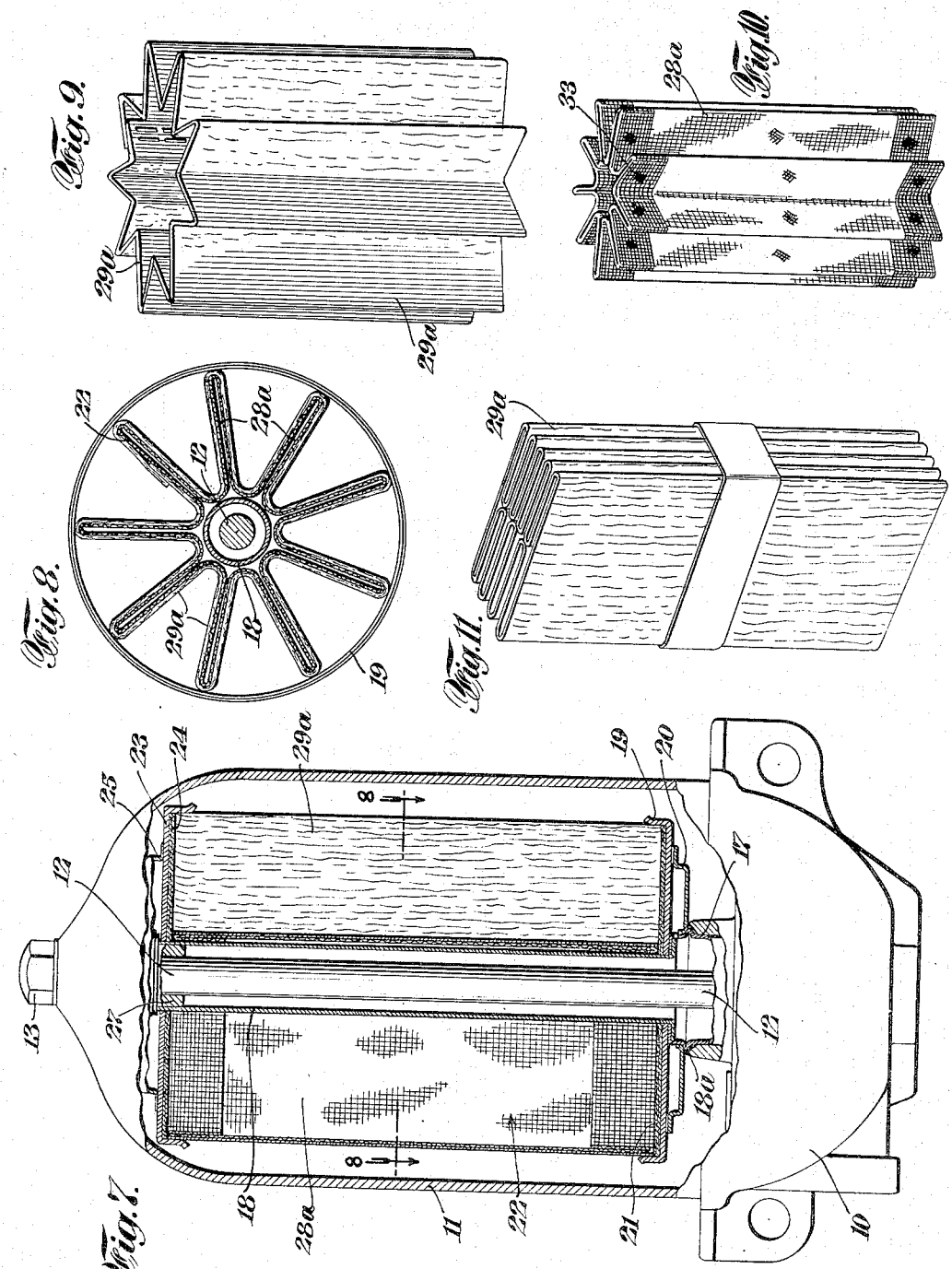

2,239,868

UNITED STATES PATENT OFFICE 2,239,868

FILTER

Lewis W. Williams, Short Hills, N. J., assignor to Motor Improvements, Inc., Newark, N. J., a corporation of Delaware Application October 27, 1938, Serial No. 237,167

9 Claims. (Cl. 210—165)

This invention relates to filters and more especially to filters for use in connection with internal combustion engines either to filter the lubricant or the fuel.

An object of this invention is a filter having a filter unit in which the filtering material is so supported and arranged that when spent, it may be easily and quickly removed from the other parts of the filter unit and fresh filtering material substituted in place of the spent filtering material.

In a filter unit embodying the invention, there is provided a filtration member consisting preferably of an endless strip of perforate metallic material, such, for example as wire mesh infolded to form flanges extending radially from a central tubular passage and a length of filtering material such, for example, as filtering paper impregnated with Bakelite surrounding said wire mesh and contacting the outer surface thereof. To complete the filter unit, there is a cap contacting each end of the filtration member, such caps preferably being resiliently pressed against the ends of the filtration member to seal the same against the flow of fluid thereinto. The liquid to be filtered is supplied to the outer surface of the strip of filtering material and the filtered liquid is removed from the interior of the filtration member through a suitable outlet.

In one form of filtration member, the edges of the filter strip are folded over the edges of the wire mesh and clamped thereto while in another form there is no interconnection between the wire mesh and the filter strip, the latter being maintained in contact with the perforate metallic material solely by being similarly folded and being retained in folded position by engagement of its edges with flanges provided on the caps. In the first form, both the perforate metallic material and the filter strip constitute a unit and when the filter strip is spent, such unit is removed and a new unit substituted for it. In the second form, merely the filter strip is removed when spent and a fresh strip substituted for it. The removal of the spent filtering material and replacement with new filtering material is made possible by the provision of supporting means for the caps and filtration member of such nature that one cap is easily disengageable from the end of the filtration member which is then free to be lifted away from its supporting means.

Other objects, novel features and advantages of this invention will become apparent from the following specification and accompanying drawings, wherein:

Fig. 1 is a vertical section through a filter equipped with one form of filtration unit embodying the invention;

Fig. 2 is a section on the line 2—2 of Fig. 1;

Fig. 3 is a perspective view of a partially completed filtration unit;

Fig. 4 is a perspective view of a filtration unit in condition for insertion into the filter;

Fig. 5 is a fragmentary enlarged section similar to Fig. 1;

Fig. 6 is a fragmentary bottom view of Fig. 5;

Fig. 7 is a view similar to Fig. 1 disclosing a modified filtration unit;

Fig. 8 is a section on the line 8—8 of Fig. 7;

Figs. 9 and 10 are perspective views of the filtering material and support therefor respectively, and Fig. 11 is a perspective view of the filtering material in condition for shipment.

Referring now more especially to Figs. 1 to 6 inclusive, a base 10 supports a casing or shell 11, the rim of which fits into a groove in the base and the shell and base are held in assembled relation by a post 12 passing through an aperture in the top of the shell and being screwed into a threaded socket in the base, a head 13' being provided on the post for rotating it and also for engaging the shell 11 for clamping purposes. In the base is provided an inlet passage 13 and an outlet passage 14 between which is arranged a by-pass passage 15 controlled by a spring-actuated relief valve 16. The outlet passage 14 terminates in a central recess 17 surrounding the post 12. The foregoing structure is conventional and does not constitute any part of the instant invention.

An apertured tubular member 18 surrounds the post 12 with its lower end being seated in the recess 17, such lower end being of larger diameter than the remainder to form a shoulder above which is arranged a cap 19 having an upturned peripheral flange. The cap 19 carries an annular member 20, the major portion of which is spaced from the cap with its inner edge resting on the rib 18a formed in the lower end of tubular member 18 and engaging the rim of the socket. Through the medium of the annular member 20, the cap 19 is resiliently supported from the rib 18a. A gasket 21 of blotting paper or the like is arranged in the cap 19 and is engaged by the bottom edge of the filtration member 22. A second cap 23 is associated with the tubular member 18 and has a down-turned peripheral flange. In the cap 23 is arranged a gasket 24 of blotting paper or the like which is engaged by the upper end of the filtration member 22. An annular member 25 is carried by the cap 23 and its inner periphery is engaged by a collar 26 screwed on to a threaded plug 27 mounted in the upper end of the tubular member 18. The cap 23 is resiliently forced downwardly through the medium of the member 25 so that both caps are resiliently held against the ends of the filtration member.

The filtration member 22 consists of a length of perforate metallic material such, for example, as wire mesh 28, the ends of which are brought together and fastened in any suitable manner. A length of suitable filtering material 29, such, for example, as filter paper impregnated with Bakelite or the like, overlies the wire mesh and the mesh and filtering material are infolded to form flanges extending radially from a central passage through which the tube 18 extends. The top and bottom edges of the strip 29 are folded over the edges of the wire mesh 28 and the filter paper is permanently clamped to the wire mesh between the upper edges of the flanges. After once assembled, the wire mesh 28 and filter paper 29 constitute a permanent unit. The structure of this filtering unit is disclosed more in detail in Lewis W. Williams Patent No. 2,218,800. The filtration unit 22 preferably is provided with an enclosing band 30 to maintain it in such condition that it may be readily assembled with the remaining elements constituting the filter.

In assembling the filtration unit with the other elements constituting the filter illustrated in Fig. 1, the assembly operation is begun with the shell 11 disengaged from the base 12 but with the tube 18 and cap 19 mounted on the base. The filtration unit is then slipped over the tubular member 18 to rest on the gasket 21. Next, the cap 23 and associated gasket 24 are placed on the top of the filtration member after which the nut 26 is screwed on to the plug 27, thereby exerting pressure on the caps 19 and 23 through the medium of the resilient members 20 and 25 to compress the gaskets 21 and 24 into sealing relation to the ends of the filtration unit. Next, the casing 11 is placed over the assembly and fastened in place through the medium of the post 12. From the foregoing description, it is evident as to the procedure to be followed in removing a spent filtration unit and substituting a fresh one.

Inasmuch as the filtering material preferably consists of filter paper impregnated with Bakelite, means are provided for by-passing a small amount of oil around the filter unit so as to insure that the oil in the filter will be raised to the proper temperature to facilitate filtration. Cold oil is of such consistency that it will not pass through Bakelite impregnated filter paper and it is for this reason that provision is made to heat the oil in the filter. For this purpose, a small aperture 31 is provided in the enlarged lower portion of the tubular member 18 and oil passes to such aperture through interstices formed between the annular member 21 and the cap 19 by minute ribs 32 provided on the member 20, these ribs being of such height as to provide an edge filter which will remove from the oil passing therethrough any solids large enough to clog the aperture 31.

In the modification disclosed in Figs. 7 to 10 inclusive, the structure is the same as previously described except with respect to the filtration unit 22. In this modification, the filtration unit also preferably comprises a wire mesh support 28a and a strip of filtering material 29a each of which is infolded to form flanges extending radially from a central passage. However, there is no interconnection between the members 28 and 29 and they are held in assembled relation solely through the peripheral flanges on the caps 19 and 23. These two members are made up individually and are brought into operative relation only when being assembled into a filter. The flange sides of 28a are welded together as indicated at 33, this member being intended for permanent use in a filter and the member 29a being the sole replaceable member. The member 29 is made up of slightly greater height than the member 28a so that its edges will engage the gaskets 21 and 24 to seal the ends of the filtration unit.

In reconditioning the filter equipped with the filtration unit of this modification, merely the filtering material 29a is removed and a fresh one substituted. Otherwise, the operation of reconditioning a filter is the same as is the case with the modification of Figs. 1 to 6.

As illustrated in Fig. 11, the filtering material may be folded into a very compact package for shipping purposes. The folds are such that the filtering material can be arranged in a relatively small package but the filtering material may be easily and quickly arranged in open relation to pass it over the support 28a and arrange its folds in contact with the flanges thereof. This modification has the effect of compactness of the filtering material for shipping purposes and ease of association of the filtering material with the support when it is desired to recondition the filter.

In the claims, the support for the filtering medium 29 has been termed "perforate metallic material" and it is intended that this term shall mean any form of metallic strip material having openings of any character through which the filtered liquid may pass.

I claim:

1. A filter unit comprising a self-sustaining filtration member consisting of an endless strip of perforate metallic material infolded to form flanges extending radially from a central tubular passage and a length of filtering material contacting the entire outer face of said perforate metallic material, a cap engaging the entire surface of each end of said filtration member, an apertured tube extending through said central passage and said caps, and resilient means carried by said tube to press said caps against the ends of said member.

2. A filter unit comprising a self-sustaining filtration member consisting of an endless strip of perforate metallic material infolded to form flanges extending radially from a central tubular passage and a length of filtering material contacting the entire outer face of said perforate metallic material, a cap engaging the entire surface of each end of said filtration member, an apertured tube extending through said central passage and said caps, means at one end of said tube engageable by one cap to locate the same relative to said tube, a collar having screw-threaded connection with the other end of said tube, and resilient means interposed between said collar and the remaining cap.

3. A filter unit comprising a filtration member consisting of a self-sustaining endless strip of perforate metallic material infolded to form flanges extending radially from a central tubular passage and a length of self-sustaining filtering material contacting the entire outer face of said perforate metallic material, caps contacting the entire surface of the ends of said filtration member, an apertured tube extending through said central passage and said caps, flanges extending from said caps and engaging the outer face of said strip along the edges thereof, said flanges constituting the sole means for maintaining said filtering material in contact with said perforate metallic material, and resilient means carried by said tube for pressing said caps against the ends of said filtration member.

4. A filter unit comprising a self-sustaining filtration member consisting of an endless strip of perforate metallic material infolded to form flanges extending radially from a central tubular passage and a length of filtering material contacting the entire outer face of said perforate metallic material, a cap engaging the entire surface of each end of said filtration member, an apertured tube extending through said central passage and said caps, and means including a member removably supported by said tube resiliently forcing said caps against the ends of said filtration member.

5. A filter unit comprising a self-sustaining filtration member consisting of an endless strip of perforate metallic material infolded to form flanges extending radially from a central tubular passage and a length of filtering material contacting the entire outer face of said perforate metallic material, a cap engaging the entire surface of each end of said filtration member, an apertured tube extending through said central passage and said caps, a resilient member carried by one cap, and means supported by said tube engaging said resilient member to force said caps against the ends of said filtration member.

6. A filter unit comprising a self-sustaining filtration member consisting of an endless strip of perforate metallic material infolded to form flanges extending radially from a central tubular passage and a length of filtering material contacting the entire outer face of said perforate metallic material, a cap engaging the entire surface of each end of said filtration member, a resilient member carried by one cap, an apertured tube extending through said central passage and said caps, a stop on said tube engaged by the remaining cap, and a member removably supported by said tube engaging said resilient member.

7. A filter unit comprising a self-sustaining filtration member consisting of an endless strip of perforate metallic material infolded to form flanges extending radially from a central tubular passage and a length of filtering material contacting the entire outer face of said perforate metallic material, a cap engaging the entire surface of each end of said filtration member, a resilient member carried by one cap, an apertured tube extending through said central passage and said caps, a stop on said tube engaged by the remaining cap, and a nut threaded on to said tube and engaging said resilient member.

8. A filter unit comprising a self-sustaining filtration member consisting of an endless strip of perforate metallic material infolded to form flanges extending radially from a central tubular passage and a length of filtering material contacting the entire outer face of said perforate metallic material, a cap engaging the entire surface of each end of said filtration member, an apertured tube extending through said central passage and said caps, means supporting one cap from said tube, and means including a member removably supported by said tube resiliently forcing said remaining cap against the end of said filtration member.

9. A filter unit comprising a self-sustaining filtration member consisting of an endless strip of perforate metallic material infolded to form flanges extending radially from a central tubular passage and an endless strip of filtering material folded to engage the entire outer face of said perforate metallic material and being free for movement longitudinally thereof, caps engaging the entire edges of said strip, and means resiliently forcing said caps against said ends, said caps having flanges engaging portions of the outer face of said strip of filtering material and constituting the sole means for maintaining said strip of filtering material in assembled relation to said strip of perforate metallic material.

LEWIS W. WILLIAMS.